United States Patent
Ross et al.

(10) Patent No.: US 7,207,583 B2
(45) Date of Patent: Apr. 24, 2007

(54) SPACER APPARATUS FOR SUSPENSION BEAM BUSHING ASSEMBLIES

(75) Inventors: Joseph M. Ross, Canton, OH (US); Phillippi R. Pierce, Canton, OH (US); John E. Ramsey, Canton, OH (US); Warren M. Schneider, Sandyville, OH (US)

(73) Assignee: Hendrickson USA, L.L.C., Canton, OH (US)

( * ) Notice: Subject to any disclaimer, the term of this patent is extended or adjusted under 35 U.S.C. 154(b) by 0 days.

(21) Appl. No.: 10/051,968

(22) Filed: Jan. 16, 2002

(65) Prior Publication Data

US 2003/0132593 A1 Jul. 17, 2003

(51) Int. Cl.
*B60G 9/02* (2006.01)

(52) U.S. Cl. .......................... 280/124.121; 280/124.11; 280/124.12; 267/270

(58) Field of Classification Search ........... 280/86.751, 280/86.754, 86.753, 86.756, 124.121, 124.144, 280/124.11, 124.111, 124.128, 124.13, 681; 267/269, 270
See application file for complete search history.

(56) References Cited

U.S. PATENT DOCUMENTS

| | | | |
|---|---|---|---|
| 3,434,707 A | | 3/1969 | Raidel |
| 3,856,325 A | * | 12/1974 | Willetts ...................... 280/687 |
| 3,976,338 A | * | 8/1976 | Trachte et al. .............. 384/220 |
| 4,585,215 A | | 4/1986 | Kramer |
| 4,757,114 A | * | 7/1988 | Tochinai et al. ............ 525/289 |
| 4,809,960 A | * | 3/1989 | Kakimoto et al. .......... 267/141 |
| 5,037,126 A | | 8/1991 | Gottschalk et al. |
| 5,275,429 A | * | 1/1994 | Bunker ................. 280/124.177 |
| 5,439,203 A | * | 8/1995 | Hadano ................. 267/140.12 |
| 5,472,226 A | | 12/1995 | Bunker |
| 6,053,489 A | | 4/2000 | Enke |
| 6,244,607 B1 | * | 6/2001 | Nishino ............... 280/124.107 |

FOREIGN PATENT DOCUMENTS

| | | |
|---|---|---|
| GB | A-348-327 | 5/1931 |
| GB | 2 317 434 A | 3/1998 |
| JP | 11051099 | 2/1999 |
| JP | 11063058 | 3/1999 |
| JP | 11210794 | 8/1999 |

* cited by examiner

*Primary Examiner*—Paul N. Dickson
*Assistant Examiner*—Toan C. To
(74) *Attorney, Agent, or Firm*—Buckingham Doolittle & Burroughs, LLP.; David P. Dureska; Edward T. Kennedy

(57) ABSTRACT

A spacer apparatus for insulating a beam bushing assembly of an axle/suspension system from direct metal-to-metal contact with the vehicle frame hanger on which the assembly is pivotally mounted. In one embodiment, an integrally-formed one-piece apparatus includes a spacer disk portion and collar portions, whereby the collars provide a complementary fit of the spacer apparatus on the bushing assembly mounting tube, and generally prevents or minimizes relative movement between the spacer disk and bushing assembly. In other embodiments, one or more load dissipation structures mounted on or forming a part of the beam and/or its bushing assembly prevent substantially non-planar surfaces of the assembly from contacting a spacer disk by increasing the bearing area of those surfaces which contact the disk. These apparatus generally eliminate excessive wear or damage to the spacer disk and possible resulting damage to the axle/suspension system.

7 Claims, 16 Drawing Sheets

SPACER APPARATUS FOR SUSPENSION BEAM BUSHING ASSEMBLIES

BACKGROUND OF THE INVENTION

1. Field of the Invention

The invention relates to vehicle axle/suspension systems, and in particular to the suspension assemblies of those systems which are useful for heavy-duty vehicles such as semi-trailers. More particularly, the invention is directed to heavy-duty suspension assemblies which include a bushing assembly for pivotally mounting one end of the suspension assembly beam to the vehicle frame via a frame hanger, wherein an improved spacer apparatus is disposed between each side of the bushing assembly and the sidewalls of the frame hanger, to generally prevent or minimize relative movement between the bushing assembly and the wear pad or spacer disk of the spacer apparatus, or alternatively to generally prevent or minimize direct contact between substantially non-planar surfaces of the bushing assembly and the spacer disk by increasing the bearing area therebetween, thus generally eliminating excessive wear or damage to the spacer disk and possible resulting damage to the axle/suspension system.

2. Background Art

Air-ride leading or trailing beam-type axle/suspension systems are conventionally utilized on heavy-duty vehicles such as semi-trailers. For the sake of illustration and understanding, an air-ride axle/suspension system having a trailing beam for use on a semi-trailer will be discussed hereinbelow. Each axle/suspension system includes a pair of transversely spaced suspension assemblies each having a trailing beam. Each beam has a generally stiff construction between its front and rear ends without any joints, pivot points, or the like, so that the beam structure itself is free of significant deflection. The stiff arms or beams of most of these types of axle/suspension systems are rigidly attached to the axle at the middle to rear end of the beam opposite from its front end that is pivotally connected to the vehicle frame hanger. Due to this rigid axle-to-beam connection, when the trailer leans from side to side during operation over the road, the axle is subjected to torsional forces. In addition, the rigid beam construction combined with the rigid axle-to-beam connection means that those torsional axle forces are transmitted forward through the beam and into rotational, fore-aft, side, and vertical movement at the pivotally attached front end of the beam.

As noted hereinabove, the beam-to-frame hanger pivotal attachment is accomplished by a bushing assembly typically comprising an elastomeric bushing which is molded around and adhesively attached to a central steel sleeve having a continuous passage formed therethrough. The elastomeric bushing in turn is press fit into a robust steel mounting tube. The entire bushing assembly is securely attached to the other components of the beam to complete the beam structure. Conventional fasteners then are used to pivotally attach the bushing assembly to the frame hanger.

Also, it is well known in the suspension art and literature that the elastomeric bushing can be designed to different specifications, thereby customizing its deflection rate which in turn dictates the amount of trailer lean that can occur for a given roll movement during operation of the vehicle. More specifically, in the above-described types of axle/suspension systems, the elastomeric bushing typically is engineered to deflect a greater amount in the vertical direction than in the fore-aft direction to allow a desirable amount of trailer lean which is neither too large or too small, while at the same time preventing excessive fore-aft movement that could cause the axle to steer off from a straight tracking condition. The larger vertical bushing deflection also assists in preventing excessive stress build-up at the rigid axle-to-beam connection which could result from the axle torsional forces, but which instead are reacted by the trailing beam through the bushing deflections. One example of this class of elastomeric bushings which deflect a larger distance in the vertical direction than in the fore-aft direction are the TRI-FUNCTIONAL (a federally registered trademark of The Boler Company) bushings, which are marketed by The Boler Company. In the described types of axle/suspension systems, the vertical movement at the point of attachment of the bushing assembly to the vehicle frame hanger can be up to about 0.75 inches in either vertical direction, and rotational movement can be as large as about 30° (thirty degrees). Such movement amounts are significant.

The pivotal connection of the suspension assembly to the frame hanger also is the location of significant side loads. Such side loads typically occur when the trailer is turning and/or its tires rub against a curb, causing side loads to be imposed on the axle. This pivotal connection via the bushing assembly is the only attachment point between each suspension assembly and the vehicle frame, other than the air spring and the shock absorber. The air spring is mounted on and extends between the rear end of the beam and the vehicle frame, and the shock absorber typically also is mounted on and extends between a selected location on the beam and vehicle frame. However, air springs and shock absorbers do not function to react side loads encountered by the axle. Thus, the above-described bushing assembly is solely responsible for reacting such side loads encountered by the axle/suspension system and its suspension assemblies.

In addition to the sources of side loads described immediately above, many roads around the world, including those in the United States, have a significant road crown to aid drainage. Due to the crown in the road, trailers often lean to the passenger side of the road and may "dogtrack" or steer toward the passenger side or berm of the road. In a trailing arm axle/suspension system, such lean to the passenger side can cause the beams to rub against the driver's side of the frame hangers to control the side movement of the axle and keep the axle tracking straight. In addition, many such crowned roads are located in remote areas and consequently sometimes are not properly maintained. Nonetheless, vehicles such as semi-trailers still must haul heavy payloads on such roads and often travel for many hours thereon before encountering well-maintained roads, which can place even more stress on the axle/suspension system.

If the side loads are large enough, and also if the lean to the passenger side severe enough and the road bumpy enough, such a trailing arm might move as much as about 0.75 inches vertically in either direction, pushing hard sideways, and rotating up to 30° (thirty degrees), all concurrently. Such loadings typically will create a significant amount of heat if the robust metal mounting tube of the bushing assembly grinds against the driver's side sidewall of the frame hanger. Of course, depending on the operational situation, such grinding also can occur on the passenger side sidewall of the frame hanger. For this reason, a spacer disk conventionally is used to insulate the opposing steel surfaces of each outer edge of the mounting tube and its respective sidewall of the frame hanger, to prevent the mounting tube from gyrating directly against the stationary frame hanger.

More particularly, a spacer disk is located between each side of the bushing assembly and its respective frame hanger sidewall. The spacer disk typically is made of a suitable plastic material that has excellent durability, such as ultra-high molecular weight polyethylene. However, such plastic materials have been found to typically deform at about 150° F., and when road conditions are severe enough, as described immediately above, the rotating, deflecting bushing assembly can generate heat reaching temperatures of about 150° F.

In addition, when the vehicle leans, the compliance in the bushing keeps the wheels on the ground at least until a tip over condition would occur. The resulting tilt or lean of each trailing beam in its respective frame hanger causes point loading of the edge of the steel bushing mounting tube against the plastic spacer disk, which in turn contacts the sidewall of the hanger. Such point or line loading is of a high enough force to deform the spacer disk material. If left unchecked, the spacer disk can become excessively worn and too thin to be effective in its insulating purpose. Eventually, the affected spacer disk will tear away and the trailing beam and especially its bushing mounting tube will grind directly into the sidewall of the hanger. The additional heat generated by the grinding steel surfaces can cause the elastomeric bushing to quickly deteriorate, which in turn can cause even more steel-on-steel grinding. If this condition is left unchecked, the suspension beam will rub a groove into the side of the hanger, which can cause the beam to become mechanically locked with the hanger and prevent it from deflecting vertically. Without proper deflection at the beam to frame hanger pivotal connection, high stresses concentrate at the rigid beam to axle connection, potentially reducing the useful life of the beam or axle. At the very least, such damage can cause excessive axle misalignment and steering problems. This type of damage to the frame hanger and/or the axle/suspension system likely would require its replacement. Of course, such damage is undesirable, inconvenient and costly.

One possible solution to the above-described problem might appear to be to increase the temperature stability of the material forming the spacer disk. However, the movement forces and point loading described immediately above, especially in combination with severe road conditions, may be too adverse even for the most advanced material to withstand for the life of the vehicle.

The present invention contemplates combining a load dissipation structure or structures with a conventional spacer disk, to comprise a spacer apparatus of individual components working in cooperation. The present invention further contemplates an integral one-piece spacer apparatus that generally eliminates relative movement between the bushing assembly and the spacer disk. More particularly, one embodiment of the spacer apparatus of the present invention minimizes or prevents the above-described relative movement between the bushing assembly and the spacer disk and transfers that relative motion to movement between the improved spacer apparatus and the frame hanger. This movement relocation significantly reduces the loads between the bushing mounting tube and the spacer disk. Two other embodiments of the present invention increase the bearing area of the material in direct contact with the spacer disk from the relatively thin edge of the bushing mounting tube to a substantially planar area of a load dissipation structure. Thus, in a vehicle roll situation, this greater planar area moves in concert with the bushing assembly and directly contacts the spacer disk, instead of the relatively thin, sharp edge of the mounting tube contacting the spacer disk. This arrangement of parts greatly reduces the force on the spacer disk from a line or point-type of contact force and into more of a flat, dispersed type of force. Thus, even though the temperatures generated by the gyrating bushing assembly still may approach the maximum that the spacer disk material can withstand, excessive wear and resultant damage to the disk will be minimized or eliminated because the forces acting on the disk are dispersed and therefore relatively low at any one point on the disk.

As a result of the improved spacer apparatus of the present invention, the spacer disk can protect the frame hanger, and the suspension assembly can operate in a normal manner without the significant possibility of mechanical lock-up with the frame hanger, and the resulting chance of damage to the hanger and the axle/suspension system.

SUMMARY OF THE INVENTION

Objectives of the present invention include providing a spacer apparatus which prevents or minimizes direct relative movement between the bushing assembly mounting tube and spacer disk as well as heat build-up, or alternatively prevents or minimizes direct line or point-type contact between the edges of the bushing mounting tube and the spacer disk.

Another objective of the present invention is to provide such a spacer apparatus which minimizes or prevents excessive wear of the spacer disk and suspension assembly frame hanger.

Still another objective of the present invention is to provide such a spacer apparatus which is economical, durable in use, and easy to install, maintain, and replace.

These objectives and advantages are obtained by the suspension assembly of an axle/suspension system, the assembly having a beam, the beam including a bushing assembly for pivotally mounting the beam on a vehicle frame via a frame hanger, wherein the improvement comprises means for substantially preventing relative movement of at least one spacer disk disposed between the bushing assembly and the frame hanger, or alternatively, preventing direct contact between substantially non-planar bearing surfaces of the beam bushing assembly and at least one spacer disk disposed between the beam bushing assembly and the frame hanger, whereby excessive wear to the spacer disk from the relative movement or the direct contact generally is prevented.

BRIEF DESCRIPTION OF THE DRAWINGS

The preferred embodiments of the invention, illustrative of the best mode in which applicants have contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENT

So that the environment in which the new spacer apparatus of the present invention is useful can be best understood, a prior art axle/suspension system using a conventional spacer disk will be described immediately below.

Figure 1:
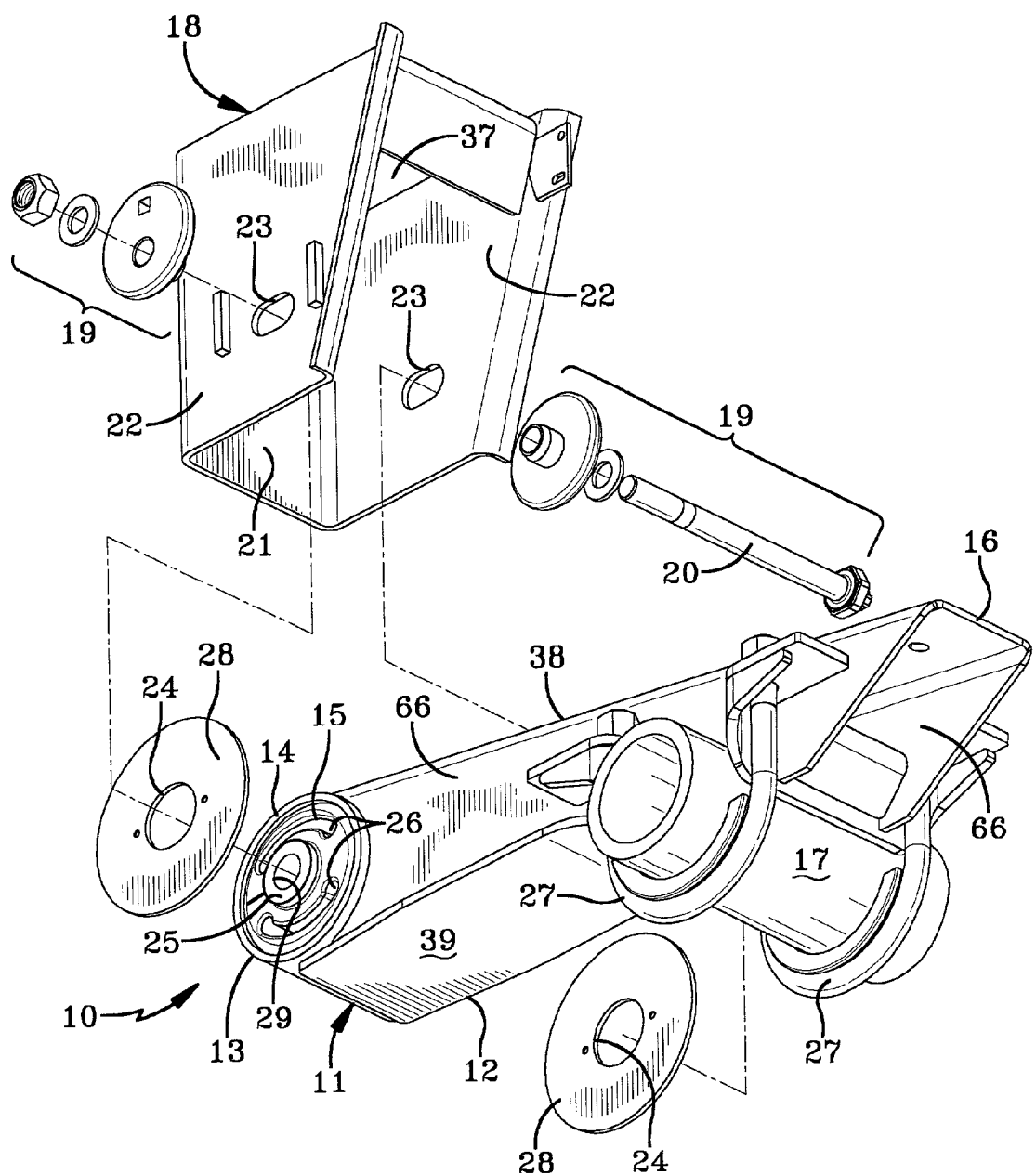
FIG. 1 is an exploded perspective view of one of the trailing beams of an axle/suspension system and the frame hanger to which it is pivotally mounted, and showing the manner in which a prior art spacer disk is disposed between each side of the bushing assembly of the beam and the hanger.

A prior art air-ride beam-type trailing arm axle/suspension system is indicated generally at 10 and is shown in FIG. 1. Axle/suspension system 10 is the subject of U.S. Pat. No. 5,037,126, is available from the assignee of the present invention, and is commercially sold as the HT Series Suspension System. Inasmuch as axle/suspension system 10 comprises an identical pair of suspension assemblies mounted on a pair of transversely spaced frame hangers depending from the vehicle frame for capturing an axle, only one of the suspension assemblies will be described herein.

Suspension assembly 11 includes a trailing arm or beam 12 which is a generally rigid metal box-like structure comprising a pair of transversely spaced vertically extending sidewalls 66, which are interconnected by horizontally extending top and bottom plates 38 and 39, respectively. Sidewalls 66 and top plate 38 are formed as a one-piece structure having a generally inverted U-shape. Bottom plate 39 is welded to sidewalls 66 to complete the structure of beam 12. The front end of beam 12 includes a bushing assembly 13 of a type which is well known in the heavy-duty axle/suspension system art. Bushing assembly 13 includes a mounting tube 14 formed of robust steel and an elastomeric bushing 15 press fit in the tube. Bushing 15 is molded about and adhesively attached to a central metal sleeve 25 formed with a continuous opening 29. Sleeve 25 preferably is formed of steel. Sleeve 25 passes completely through bushing 15 and extends outwardly from the sidewalls thereof for facilitating mounting of beam 12 on the vehicle frame, which will be described in greater detail hereinbelow. As is well known in the art, the durometer of elastomeric bushing 15 can be varied depending on the application and the bushing deflection properties desired. To generally achieve a softer ride in the vertical direction and a stiffer ride in the fore-aft direction, bushing 15 is formed with a pair of voids 26 in each of its sidewalls.

The rear end of trailing beam 12 forms a platform 16 for supporting a conventional bellows-type air spring (not shown), which extends between and is attached to platform 16 and the vehicle frame (not shown). A shock absorber (not shown) also is attached to and extends between beam 12 and the vehicle frame at selected locations to complete the major components of suspension assembly 11. A usual axle 17 extends between and is rigidly captured in the rear end of each beam 12 by beam U-bolts 27.

Suspension assembly beam 12 is pivotally mounted (see also FIGS. 1A and 1B) on the vehicle frame via a frame hanger 18 which depends from and is secured to the frame by any suitable means such as welds. Frame hanger 18 typically is a generally box-like sturdy steel structure having a vertically extending front wall 21 and a top wall 37 which are each attached to and extend between a pair of vertically extending sidewalls 22. A well-known fastener assembly 19 includes a bolt 20 which passes through a pair of aligned openings 23 formed in hanger sidewalls 22, a pair of aligned openings 24 formed in a pair of conventional spacer disks 28, and aligned continuous opening 29 of bushing sleeve 25. Each spacer disk 28 typically is formed of ultrahigh molecular weight polyethylene, and is disposed about bushing assembly sleeve 25 between a respective one of hanger sidewalls 22 and bushing 15 and its mounting tube 14, to insulate against metal-to-metal contact between the mounting tube and the hanger sidewalls.

Figure 1A:
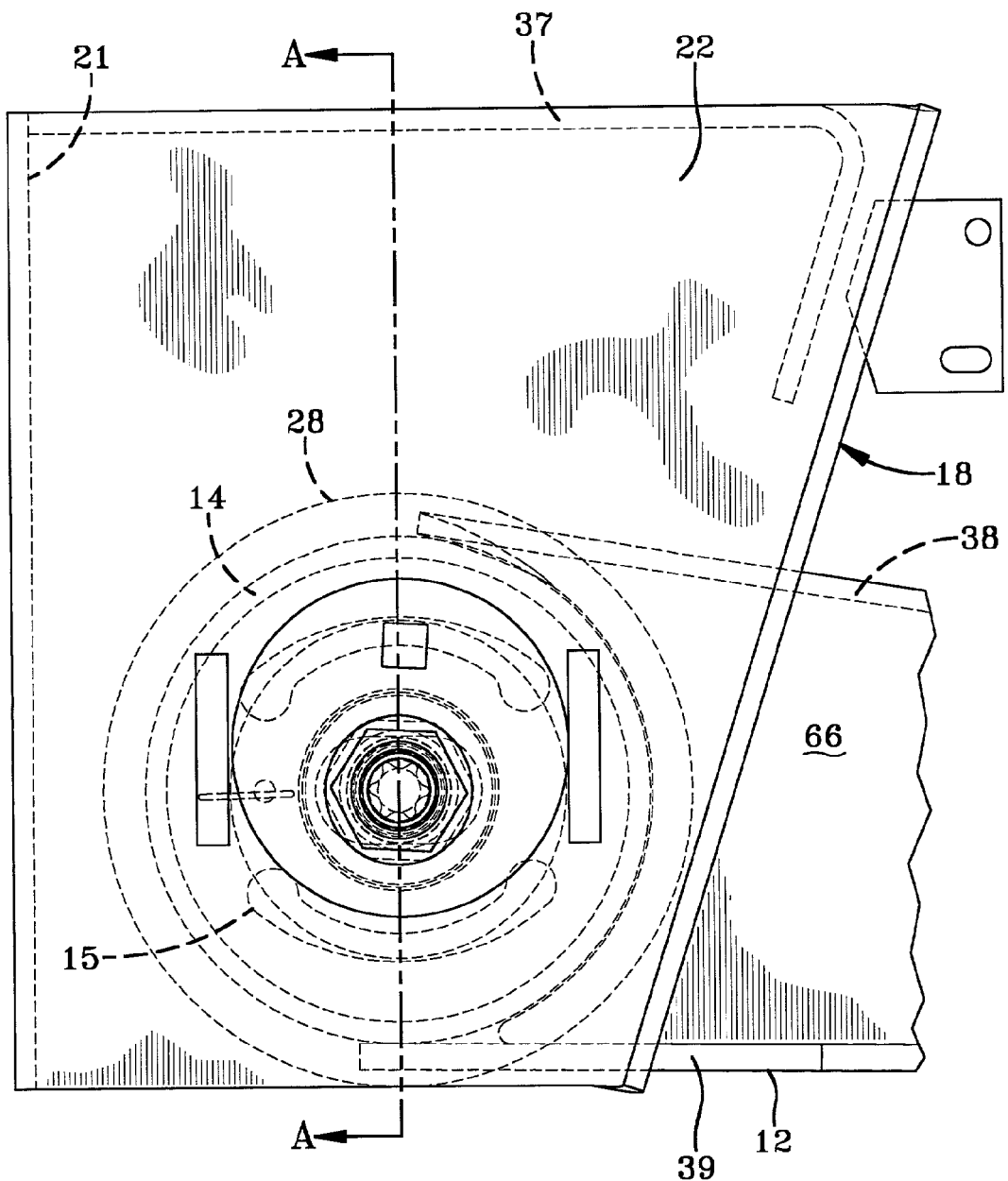
FIG. 1A is an enlarged fragmentary elevational view, with hidden parts represented by phantom lines, showing the beam bushing assembly pivotally mounted on the frame hanger.
Figure 1B:
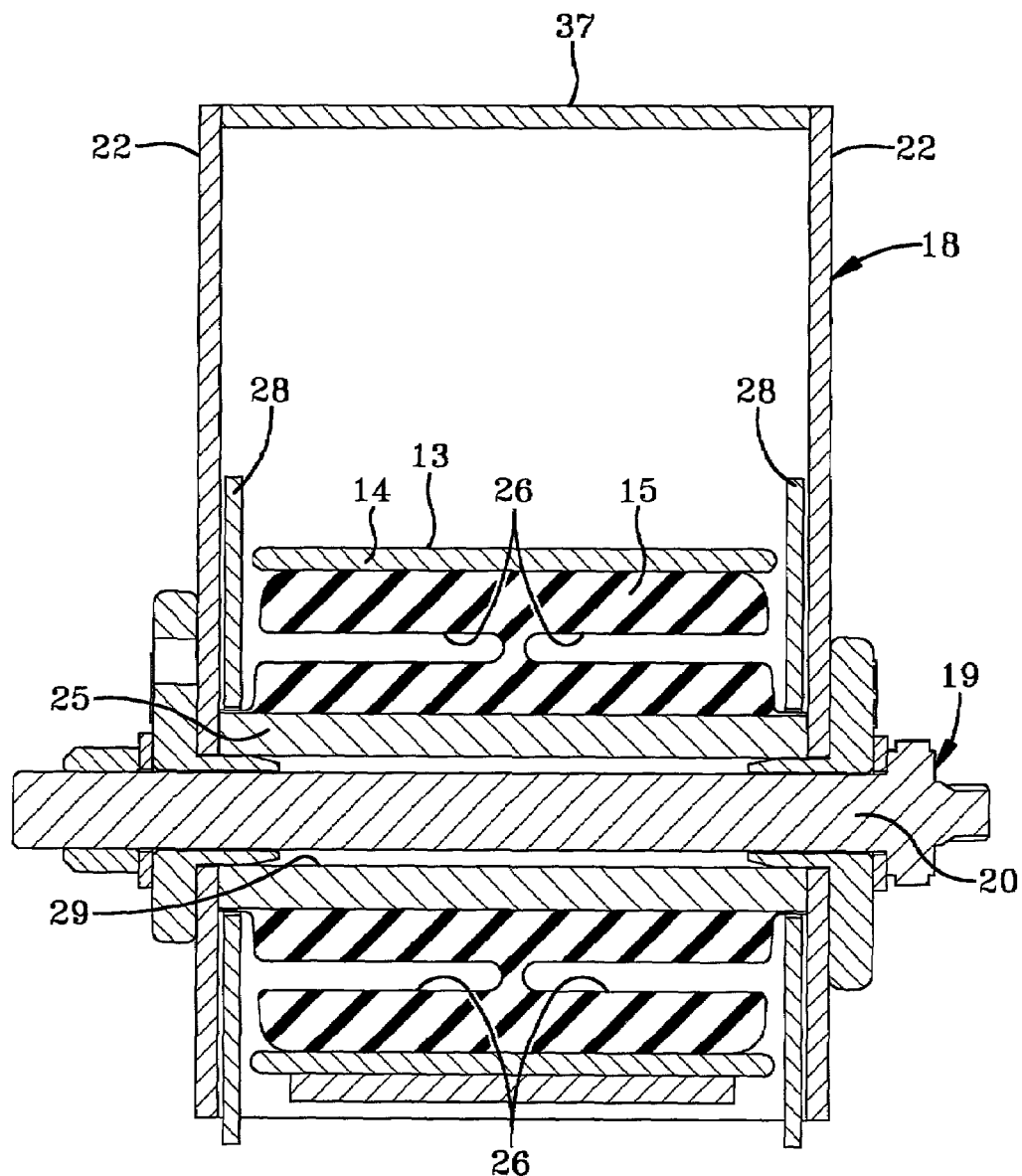
FIG. 1B is a sectional view taken along lines A—A of FIG. 1A and showing the bushing assembly in a static condition.
Figure 1C:
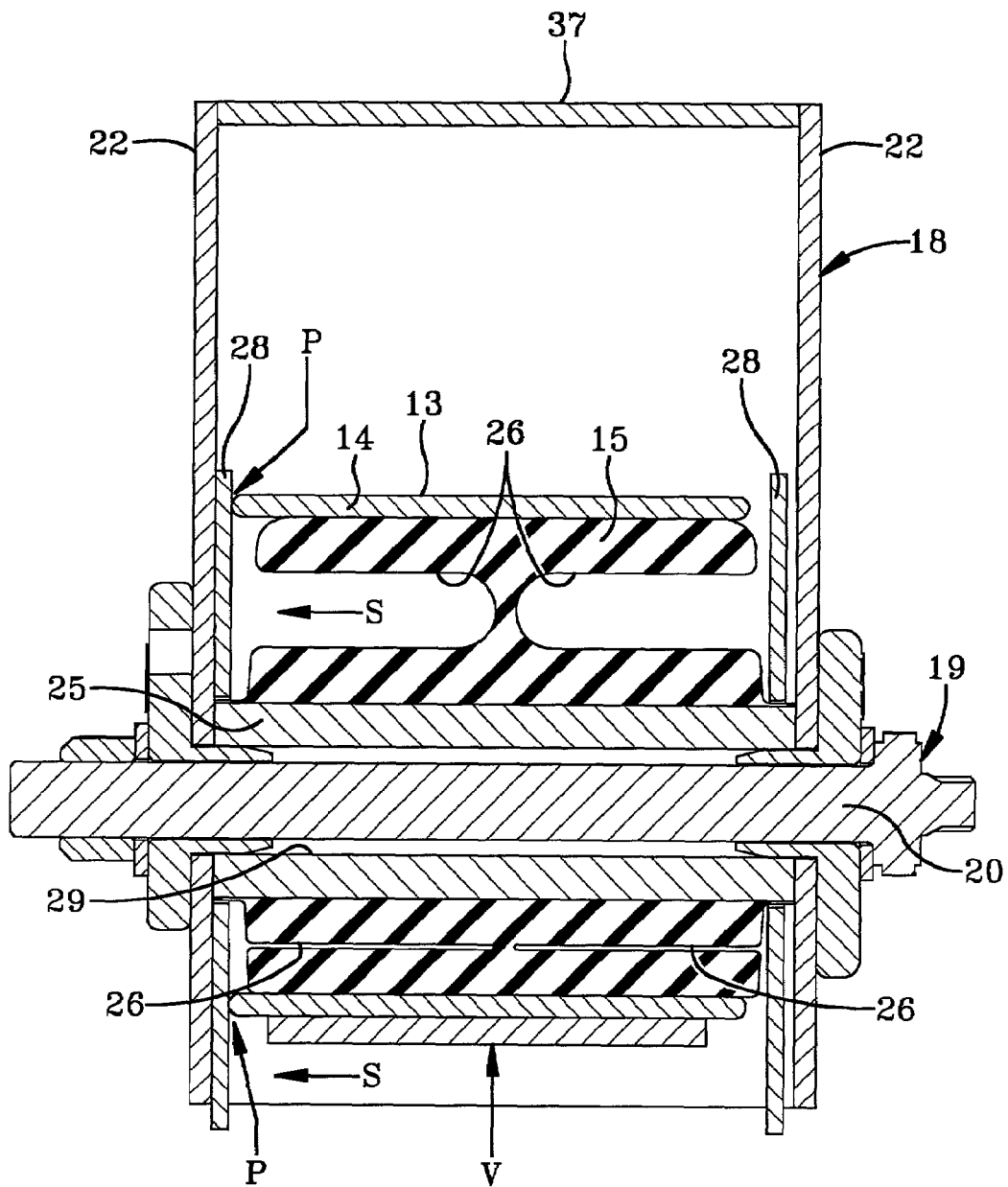
FIG. 1C is a view similar to FIG. 1B, but showing one type of relative movement that can occur between the bushing assembly and conventional spacer disks under side and vertical loading conditions, whereby undesirable point or line-type contact occurs between the bushing assembly mounting tube edges and the spacer disk.

FIGS. 1A and 1B represent pivotally mounted beam bushing assembly 13 in a static state when the trailer is non-operational. FIG. 1C represents one possible scenario of how bushing assembly 13 reacts when axle 17 and rigidly attached beam 12 are subjected to vertical and side loads represented by arrows V and S, respectively, such as when the vehicle is cornering. As can be seen, relative movement toward the vehicle driver's side occurs between mounting tube 14 and spacer disks 28, which can cause line or point contact between the mounting tube driver's side edge and the driver's side spacer disk as shown by arrows P. As discussed hereinabove, this relative movement can cause damage to and eventually destruction of wear pad 28 and lead to direct steel on steel line or point contact between mounting tube 14 and the interior surface of driver's side hanger sidewall 22. Such direct contact can cause grooves to form in sidewall 22, in turn preventing desired vertical movement of suspension beam 12 by mechanically locking the beam and hanger 18. This locking can result in the torsional loads on axle 17 not being properly transferred through beam 12, hanger 18, and into the vehicle frame. The heat generated by the direct steel-to-steel contact can also cause damage and destruction of elastomeric bushing 15, rendering it useless for its intended dampening purpose. If such a condition persists, severe damage also can occur to hanger 18, beam 12 and axle 17.

The spacer apparatus of the present invention now will be described. However, inasmuch as suspension assembly 11 and frame hanger 18 are virtually identical to that shown in prior art FIGS. 1–1C for the first two embodiments of the present invention, only the differences in the improved spacer apparatus for providing a buffer between the interior surfaces of frame hanger sidewalls 22 and bushing assembly 13 will be described.

Figure 2:
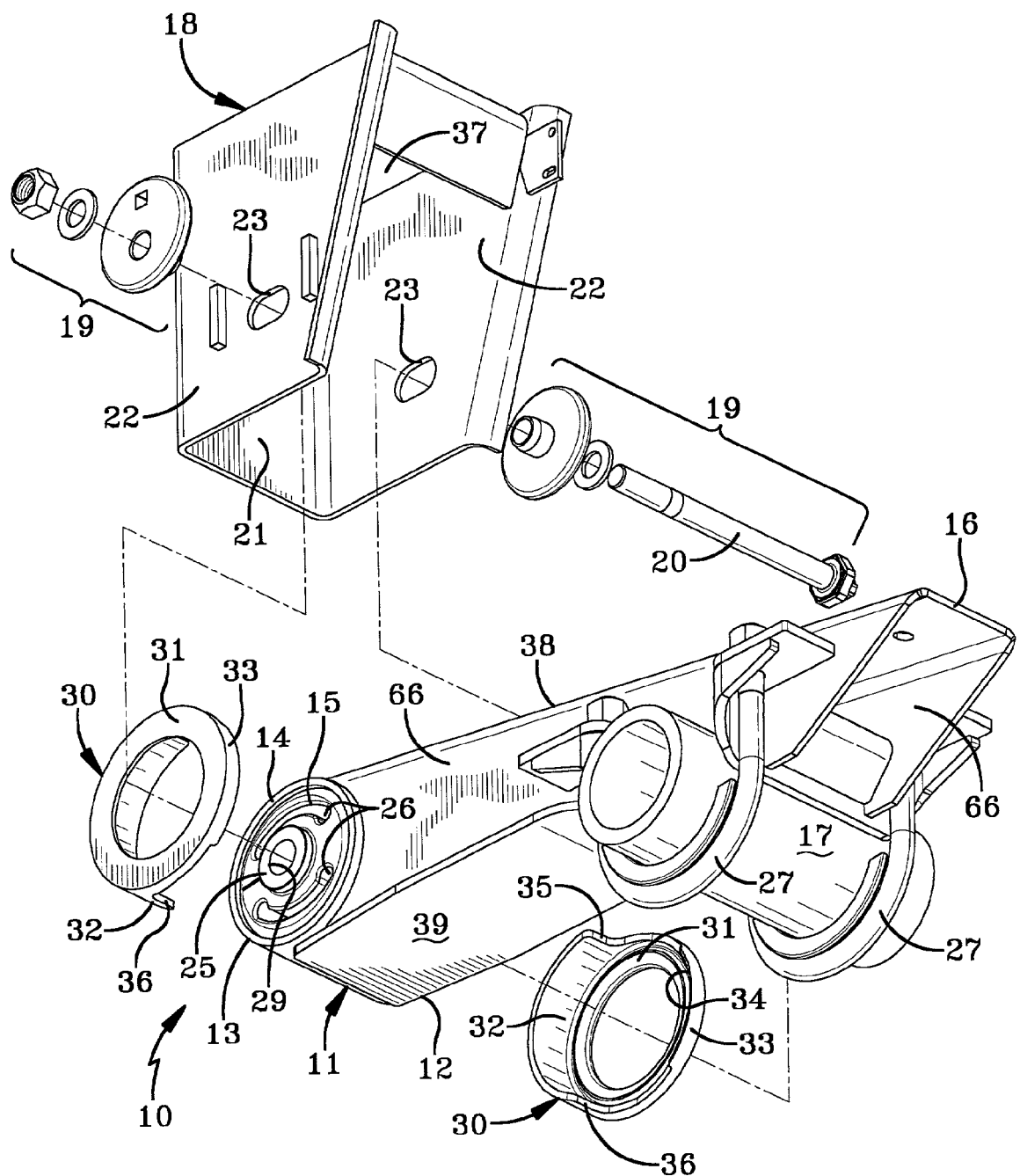
FIG. 2 is an exploded perspective view similar to FIG. 1, but showing a first embodiment of the present invention, wherein the spacer apparatus is an integrally formed one-piece structure.
Figure 2A:
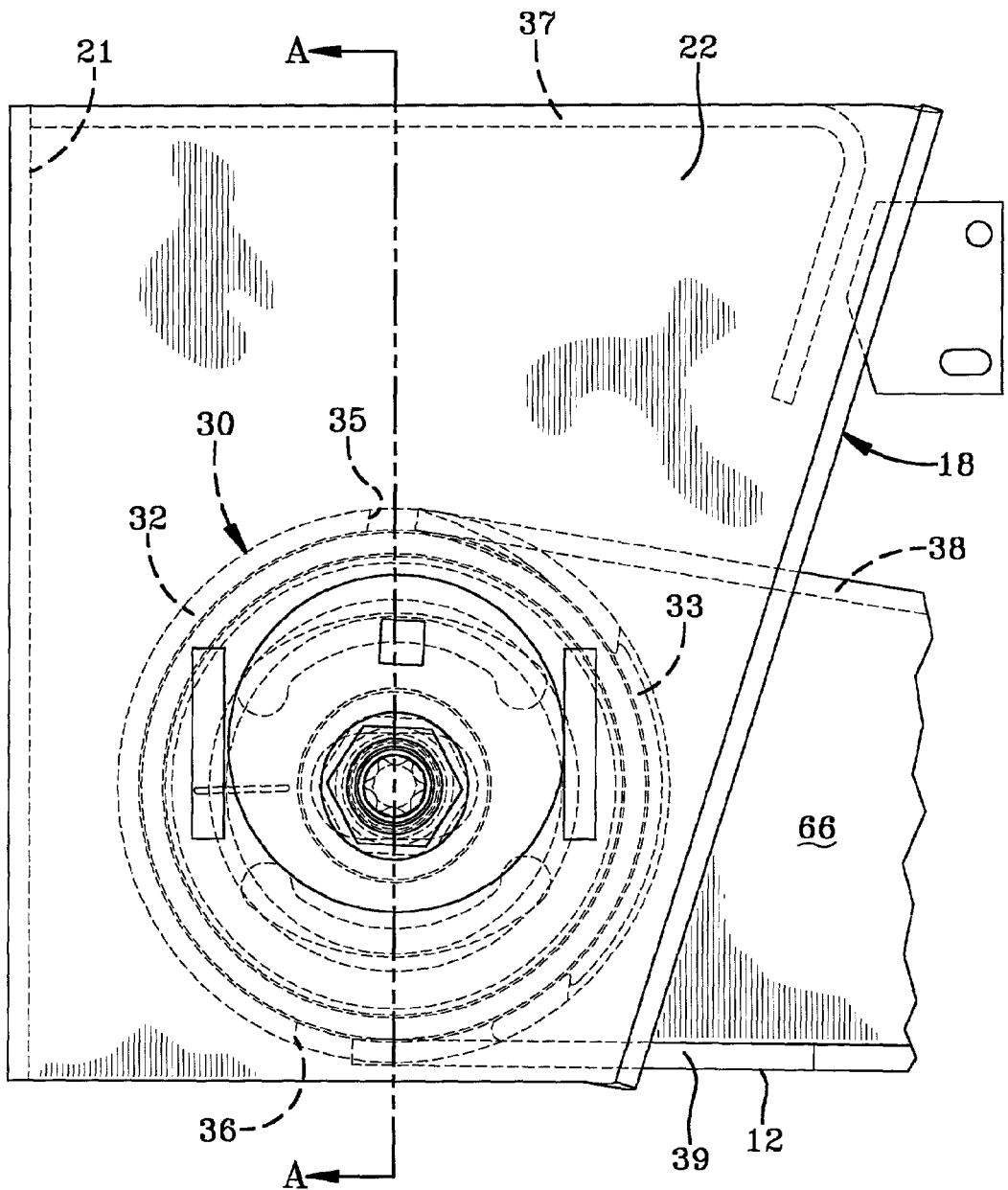
FIG. 2A is an enlarged fragmentary elevational view, with hidden parts represented by phantom lines, showing the beam bushing assembly pivotally mounted on the frame hanger.
Figure 2B:
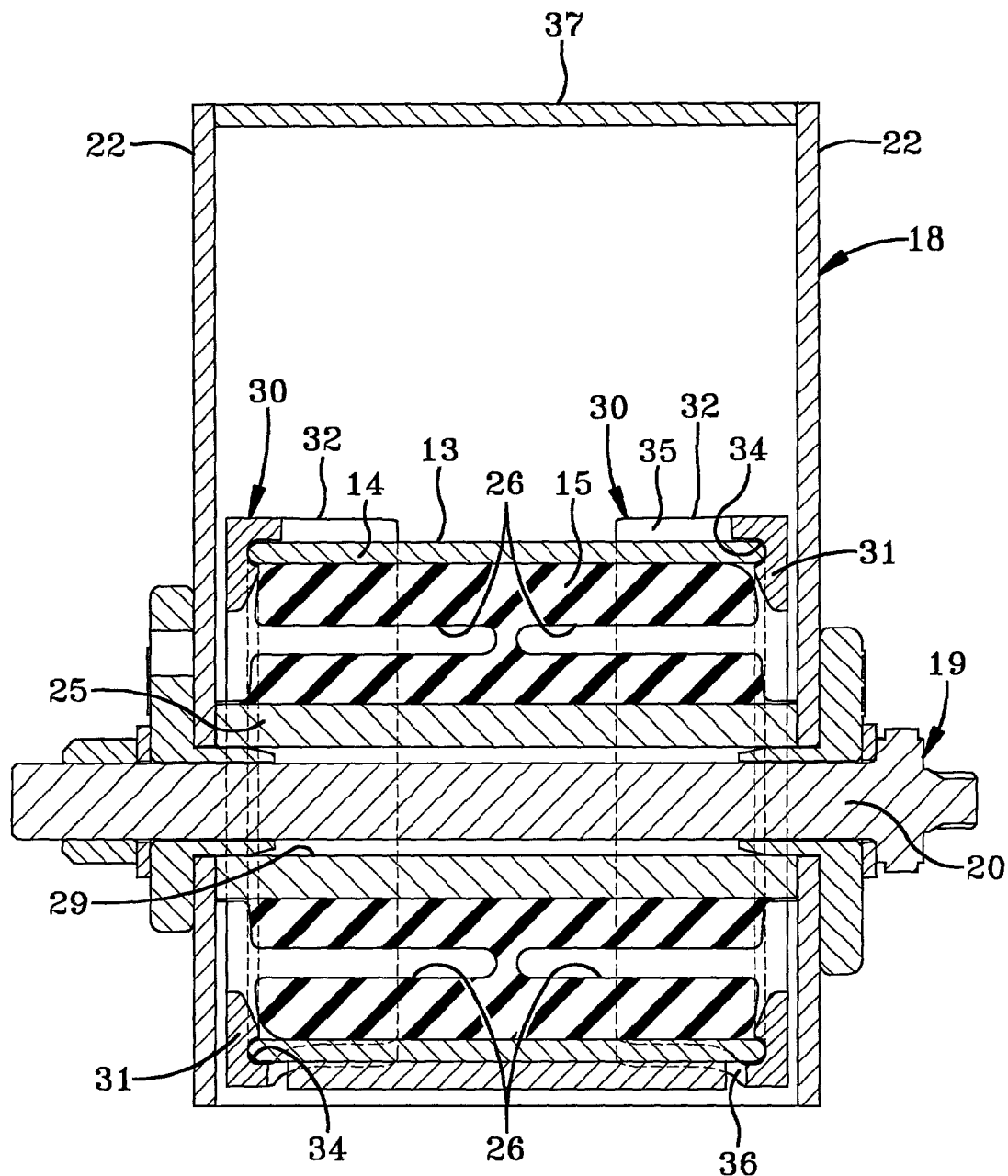
FIG. 2B is a sectional view taken along lines A—A of FIG. 2A and showing the bushing assembly in a static condition.
Figure 2C:
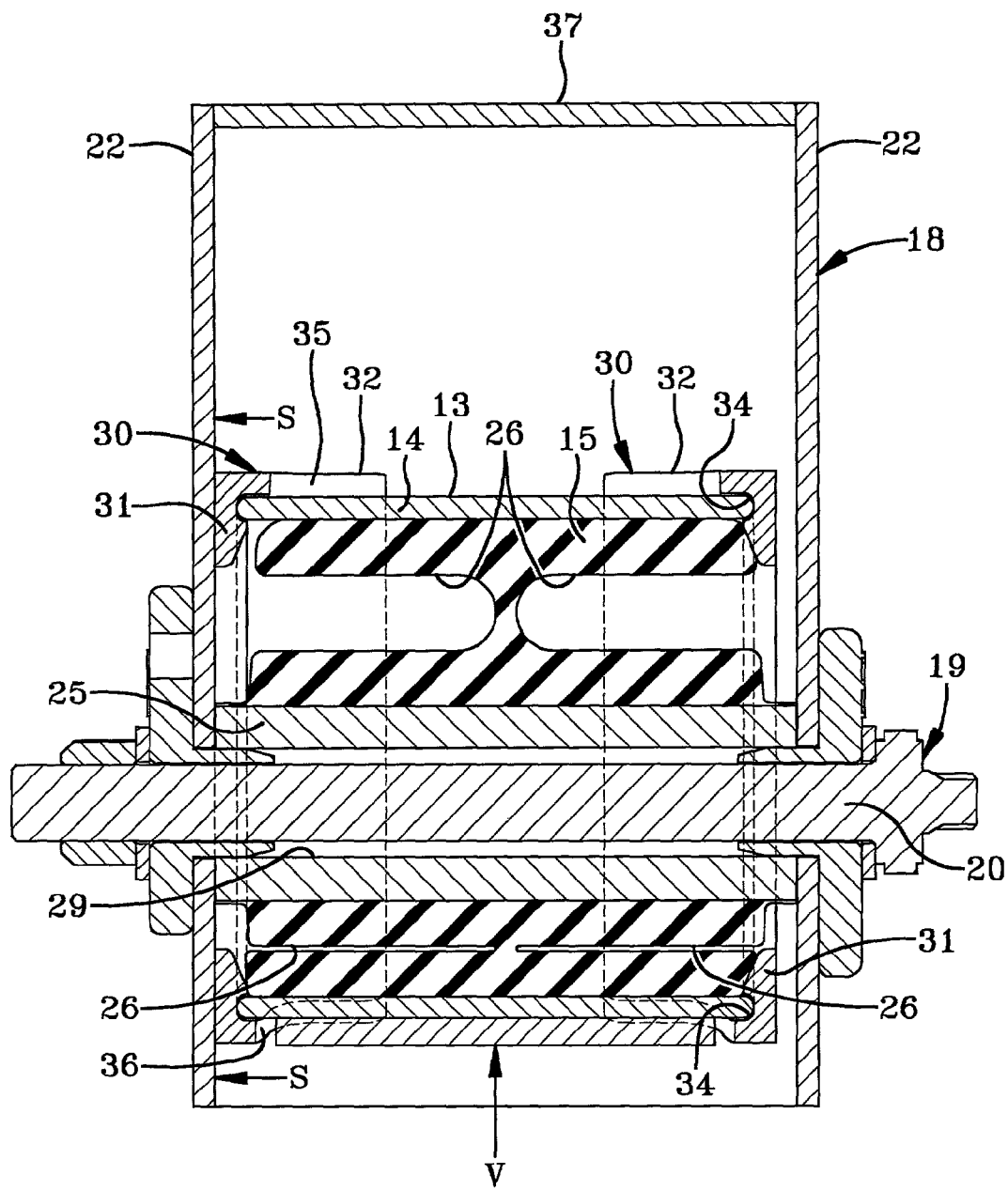
FIG. 2C is a view similar to FIG. 2B, but illustrating the desirable lack of relative movement between the bushing assembly and the spacer apparatus under side and vertical loading conditions, whereby the relative movement occurs between the spacer apparatus and frame hanger.

A first embodiment of the present invention is shown FIGS. 2–2C, and eliminates traditional spacer disks 28 and replaces each of them with an integrally formed one-piece spacer apparatus 30. Spacer apparatus 30 preferably is molded from the same material as prior art spacer disks 28, namely, ultrahigh molecular weight polyethylene. Spacer apparatus 30 includes a spacer disk portion 31 which serves to insulate against metal-to-metal contact between mounting tube 14 and hanger sidewalls 22. Front and rear collars 32 and 33, respectively, extend toward mounting tube 14 perpendicularly from the peripheral edge of disk 31. More specifically, front collar 32 extends along about the front one-half of the periphery of disk 31, and rear collar 33 extends along about half of the rear one-half of the periphery of disk 31 and is opposed to front collar 32. Front collar 32 extends toward mounting tube 14 a significantly greater distance, or about four times more than rear collar 33. The surface of disk 31 adjacent to its respective hanger sidewall 22 is flat and smooth, and the surface of the disk adjacent to mounting tube 14 is formed with a continuous channel or groove 34 adjacent to collars 32, 33.

Thus, the combination of collars 32, 33 and groove 34 serve to pilot each spacer apparatus 30 onto the outside and inside diameters of mounting tube 14 (see FIGS. 2A and 2B), and also to position the apparatus relative to top and bottom beam plates 38 and 39, respectively, and a respective one of the pair of beam sidewalls 66. Spacer apparatus 30 thereby achieves a complementary-shaped fit onto mounting tube 14, and front collar 32 additionally aids in preventing excessive rotation of the spacer apparatus due to the engagement of top and bottom rear edges, 35 and 36, respectively, of the collar with the front edge of top and bottom beam plates 38 and 39, respectively, if any slight rotation of the spacer apparatus occurs. However, it is understood that preventing rotation of spacer apparatus 30, while preferred and achieved due to its structure for fitting onto mounting tube 14, is not necessary for the proper functioning of the present invention.

Therefore, the integral one-piece design of spacer apparatus 30, together with its complementary-shaped fit with mounting tube 14, prevents relative transverse motion between the tube and spacer disk 31, during operation of the vehicle, unlike prior art mounting tubes and spacer disks 28. Thus, damage to disk 31 due to line or point contact forces from the edge of mounting tube 14 rubbing against or striking the disk during articulation of pivotally mounted beam 12 are minimized or altogether eliminated. Instead, when vertical and/or side load forces V and S, respectively, cause disk 31 to rub against or strike hanger sidewall 22, the forces are generally evenly distributed throughout the planar surface of the disk, thus providing effective insulation against direct metal-to-metal contact between tube 14 and hanger sidewall 22.

Figure 3:
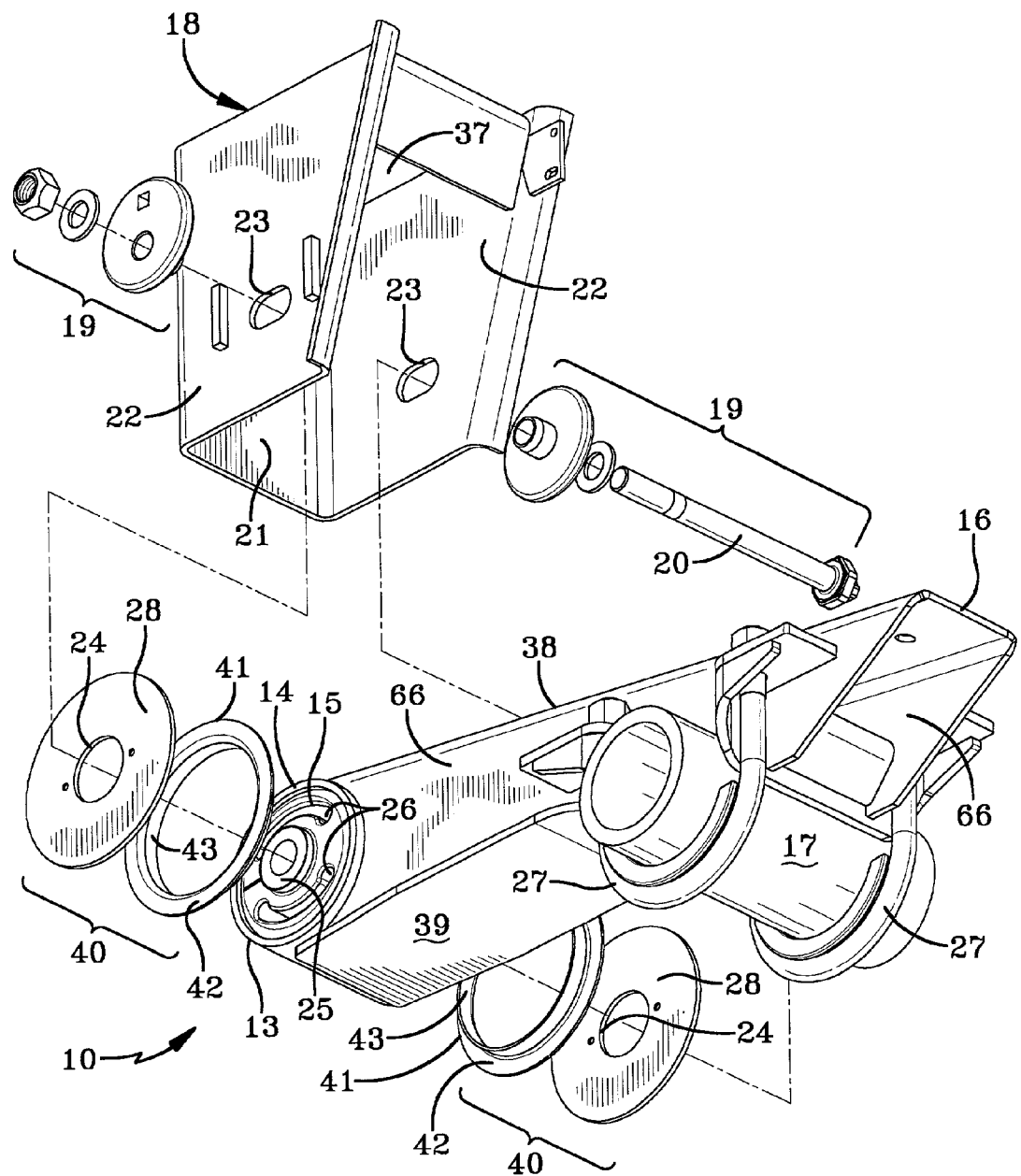
FIG. 3 is an exploded perspective view similar to FIG. 1, but showing a second embodiment of the present invention, wherein the spacer apparatus comprises two separate components including a traditional spacer disk and a load dissipation member.
Figure 3A:
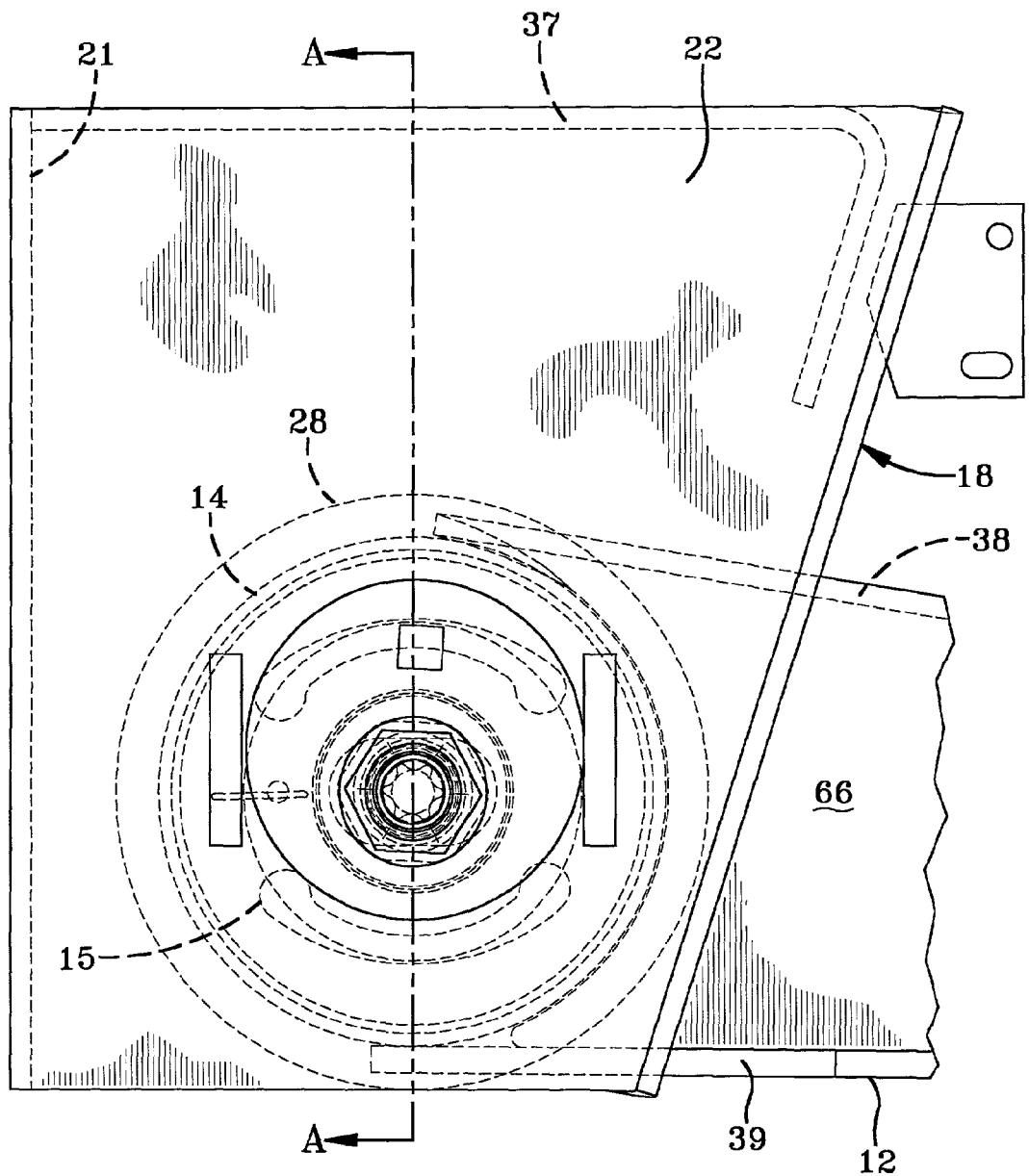
FIG. 3A is an enlarged fragmentary elevational view, with hidden parts represented by phantom lines, showing the beam bushing assembly pivotally mounted on the frame hanger.
Figure 3B:
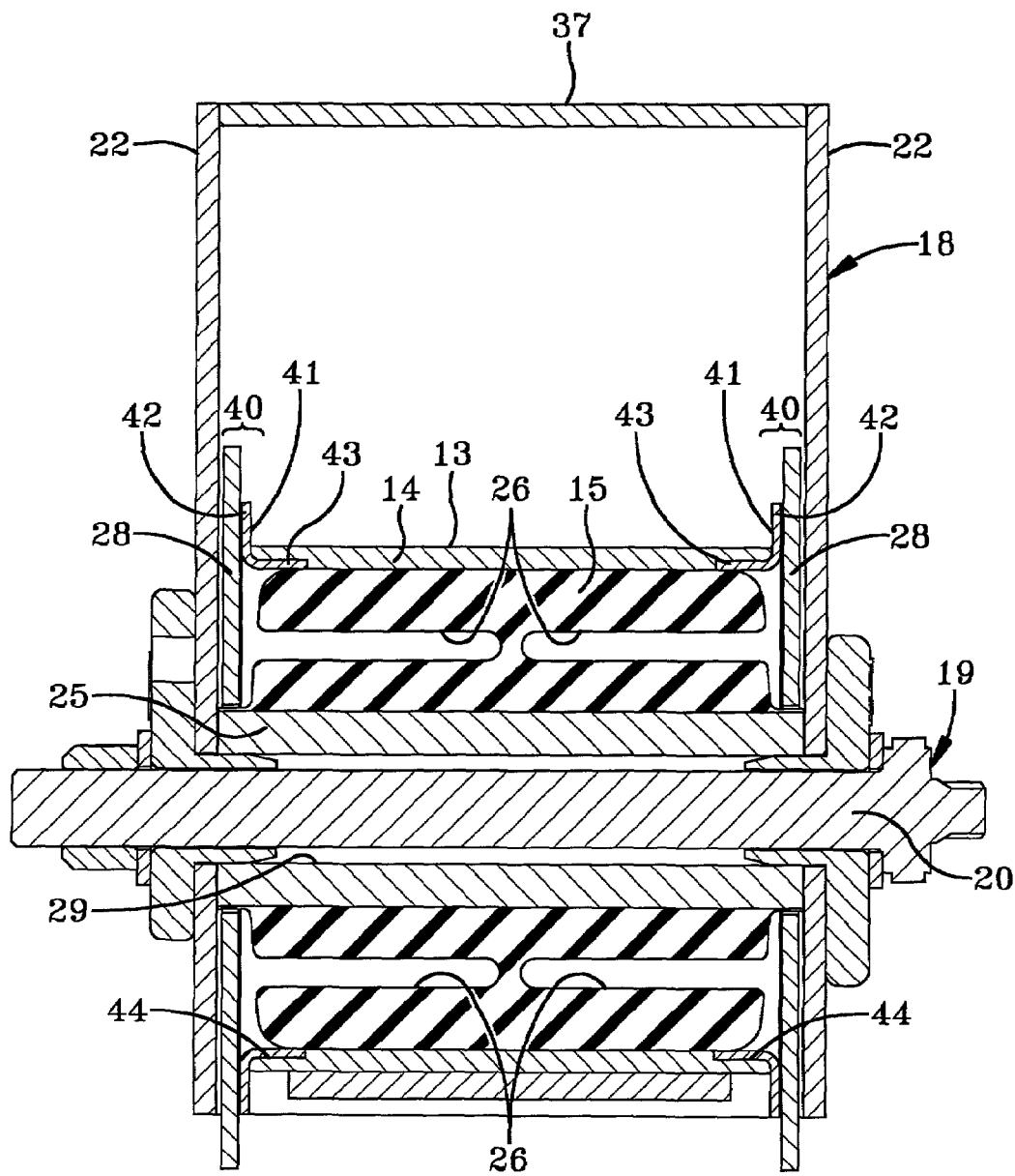
FIG. 3B is a sectional view taken along lines A—A of FIG. 3A and showing the bushing assembly in a static condition.
Figure 3C:
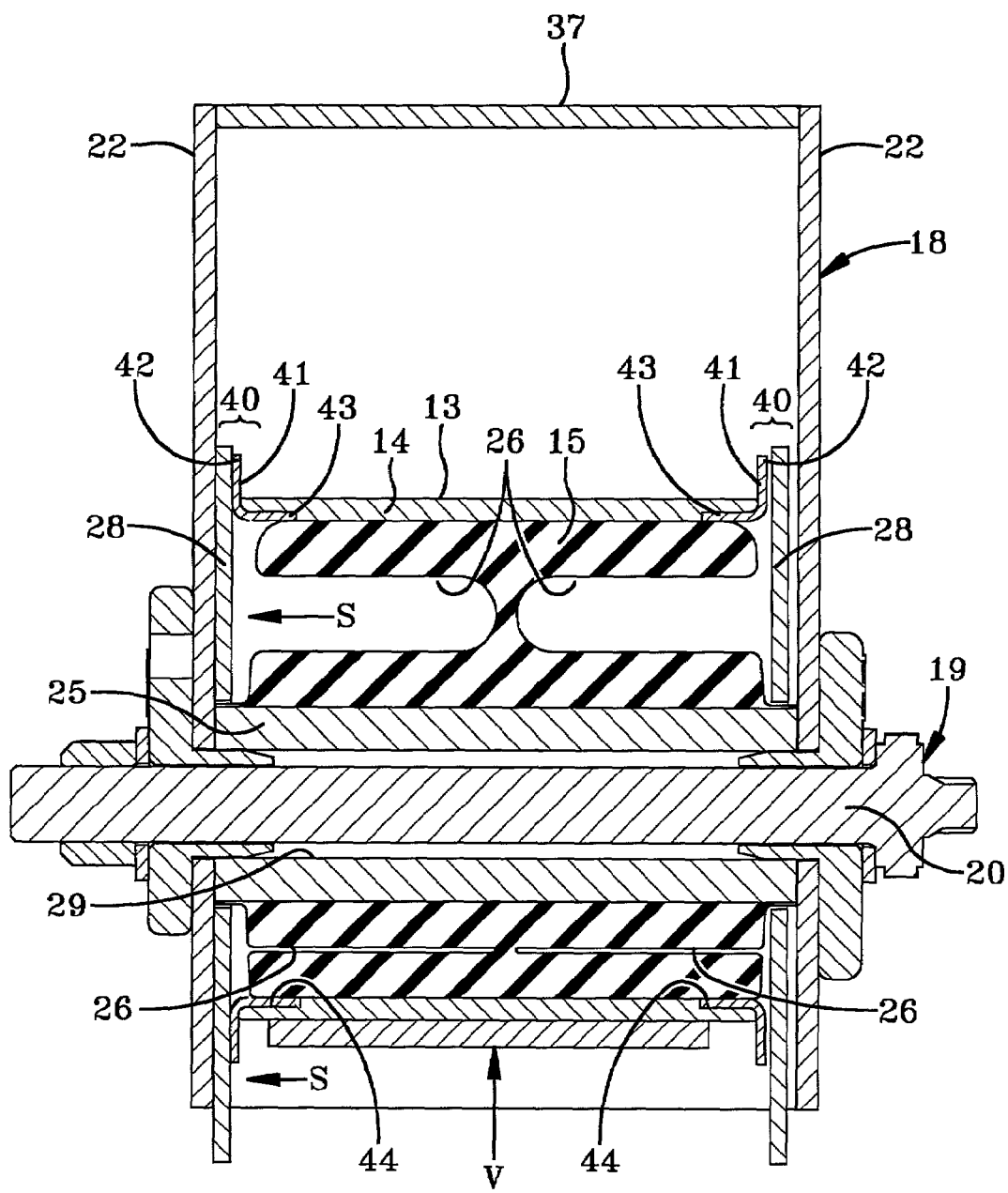
FIG. 3C is a view similar to FIG. 3B, but illustrating the desirable lack of point or line-type contact between the bushing assembly mounting tube edges and the spacer disks under side and vertical loading conditions.

A second embodiment of the present invention is shown in FIGS. 3–3C. Second embodiment spacer apparatus 40 is a two-piece structure which includes a traditional spacer disk 28 and a load dissipation member 41. More particularly, load dissipation member 41 is an integral one-piece member preferably formed of steel. Load dissipation member 41 includes a planar ring portion 42 having a flat, smooth surface adjacent to spacer disk 28. A continuous flange 43 extends outwardly perpendicularly from the inner circumference of ring 42 and in the direction of mounting tube 14. The inside diameter of mounting tube 14 is coped so that a continuous notch 44 is formed along the outer edge of the tube for receiving flange 43 and frictionally mounting load dissipation member 41 on the tube.

Thus, load dissipation member 41, as best shown in FIG. 3C, prevents the relatively sharp edges of mounting tube 14 from directly rubbing against or striking spacer disk 28 when vertical and side load forces V and S, respectively, are reacted by bushing assembly 13 during operation of the vehicle, unlike the prior art arrangement of parts shown in FIGS. 1–1C. More specifically, when vertical and/or side load forces cause mounting tube 14 and load dissipation member 41 to move in concert and strike one of the spacer disks 28, which in turn strikes hanger sidewall 22, the forces from the mounting tube are generally evenly distributed throughout planar ring 42. The larger bearing surface of planar ring 42 in turn contacts spacer disk 28 and similarly more evenly distributes such forces. Thus, damage to spacer disks 28 due to direct line or point contact from the edges of mounting tube 14 generally is eliminated. Thus, second embodiment spacer apparatus 40 of the present invention also effectively insulates against direct metal-to-metal contact between tube 14 and hanger sidewall 22 by protecting the integrity of spacer disks 28.

Figure 4:
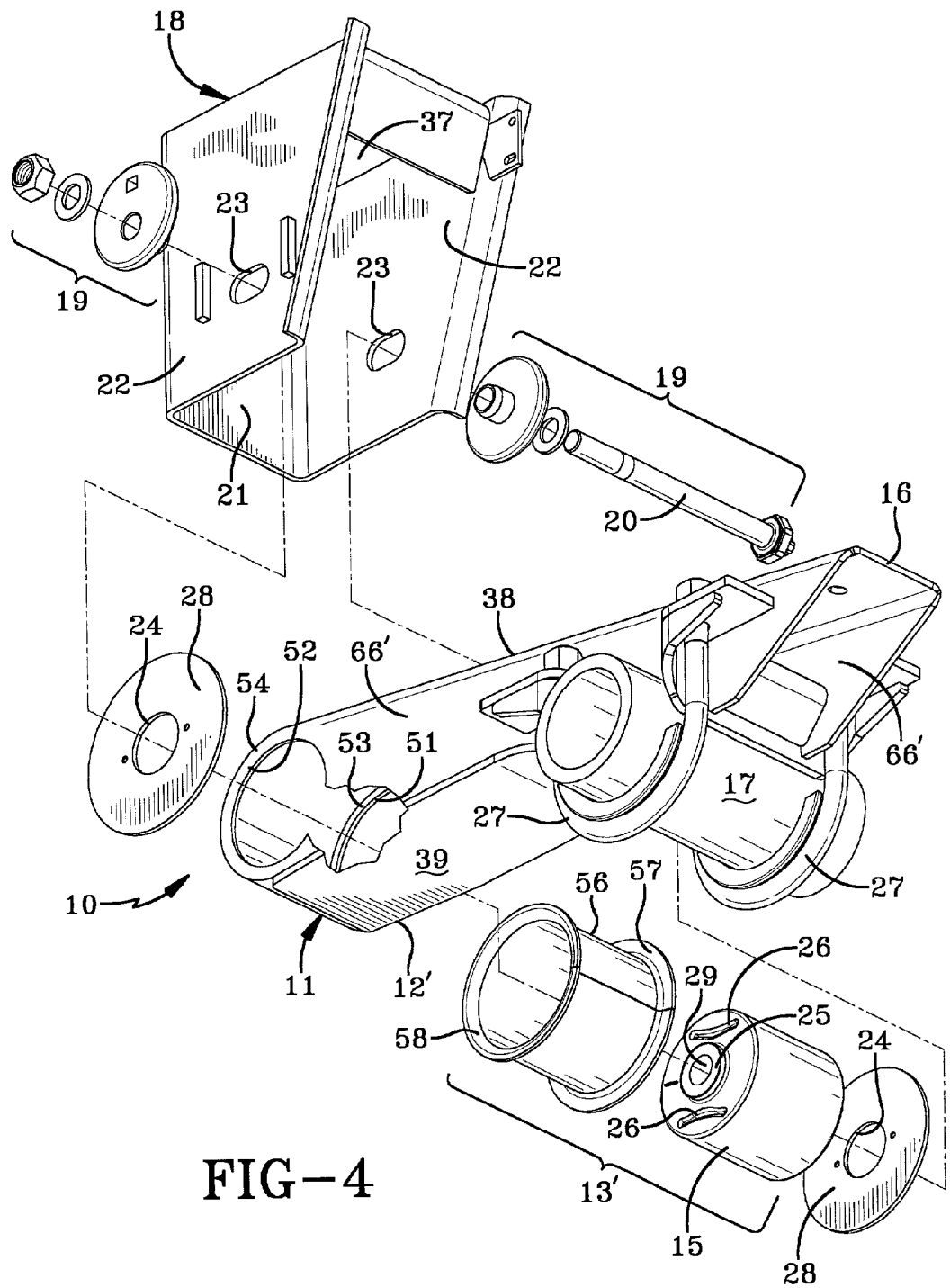
FIG. 4 is an exploded perspective view similar to FIG. 1, but showing a third embodiment of the present invention, wherein the spacer apparatus comprises three separate components including a traditional spacer disk, a portion of the beam sidewall, and a circular flange formed on the bushing mounting tube.
Figure 4A:
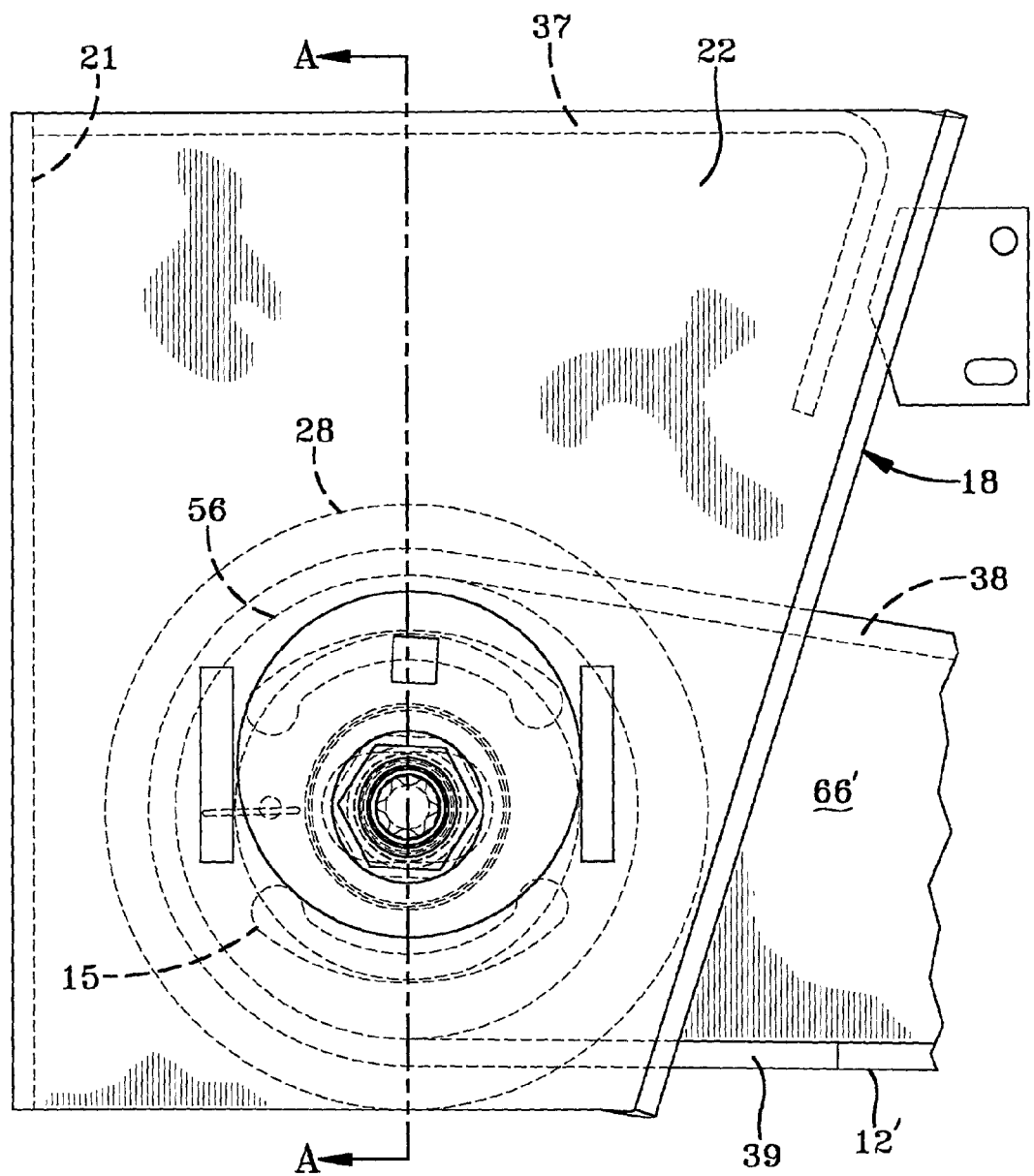
FIG. 4A is an enlarged fragmentary elevational view, with hidden parts represented by phantom lines, showing the beam bushing assembly pivotally mounted on the frame hanger.
Figure 4B:
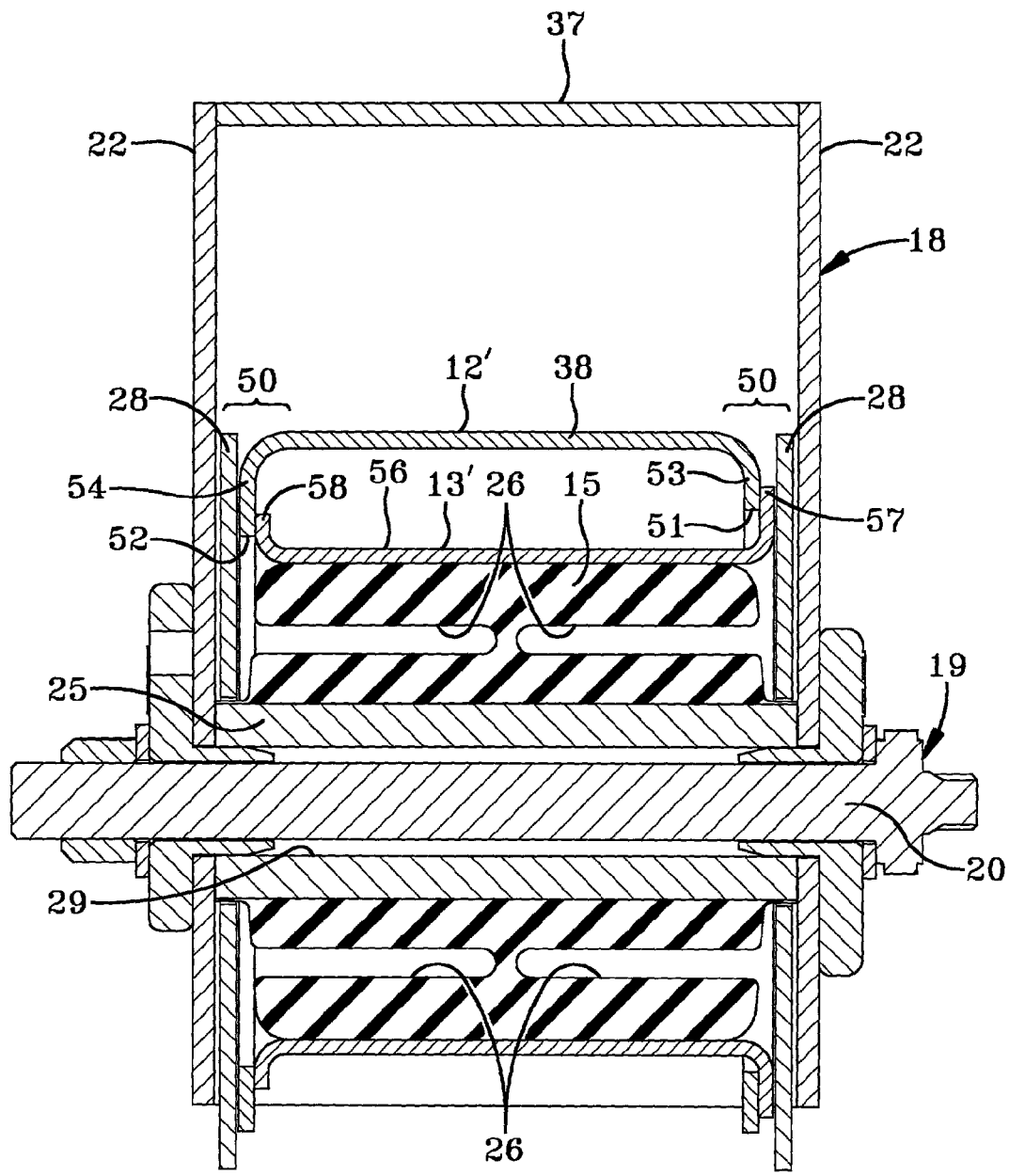
FIG. 4B is a sectional view taken along lines A—A of FIG. 4A and showing the bushing assembly in a static condition.
Figure 4C:
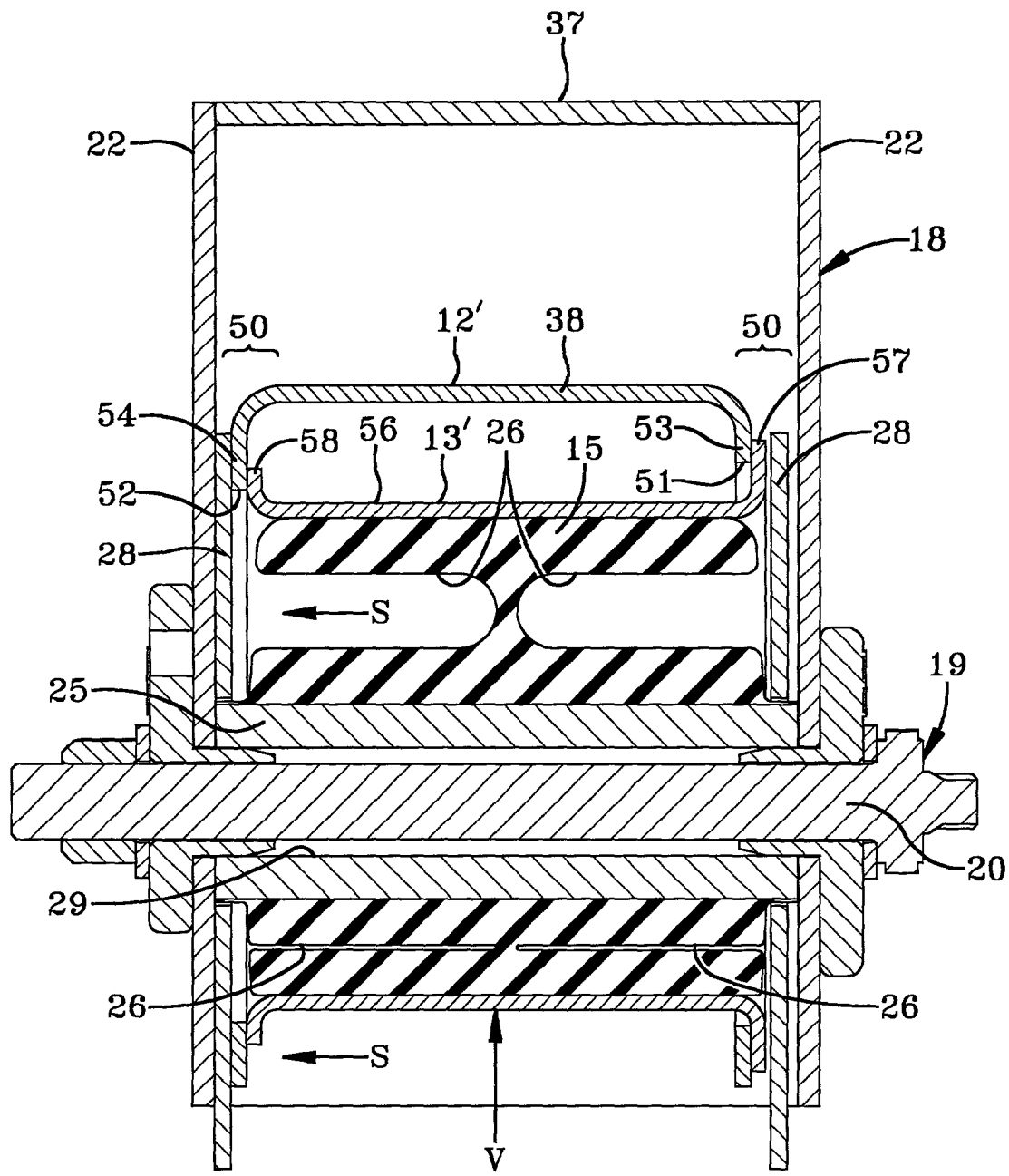
FIG. 4C is a view similar to FIG. 4B, but illustrating the desirable lack of point or line-type contact between the bushing assembly mounting tube and the spacer disks under side and vertical loading conditions.

A third embodiment of the present invention is shown in FIGS. 4–4C. Third embodiment spacer apparatus 50 is a multiple-piece structure which includes a traditional spacer disk 28. The components of the axle/suspension system on which third embodiment 50 of the present invention can be utilized are identical to those utilized with in the first two embodiments of the present invention and prior art axle/suspension system 10, except that the front end of beam 12' is modified, and in particular sidewalls 66' and bushing assembly 13' thereof are different. More particularly, beam 12' is identical to prior art beam 12, with the only difference being that the front end of the beam sidewalls 66' and bushing assembly 13' are modified to act as load dissipation structures, similar to load dissipation member 41 of second embodiment 40 of the present invention. More specifically, an orifice 51, 52 is formed in the front end of a respective one of each beam sidewall 66,' so that the respective sidewalls have a ring-like planar portion 53, 54 of the sidewall surrounding each orifice 51, 52, respectively (see FIGS. 4 and 4B). Outboard orifice 52 is smaller in diameter than inboard orifice 51, so that outboard sidewall ring 54 is wider than inboard sidewall ring 53. It is understood that this arrangement could be reversed, that is, locating inboard orifice 51 on outboard sidewall 66' and outboard orifice 52 on inboard sidewall 66' without affecting the concept of the present invention.

As noted above, spacer apparatus 50 also has components incorporated into bushing assembly 13'. More particularly, bushing assembly 13' includes a robust steel bushing mounting tube 56 which is a spool-like structure having a continuous outboard flange 58 and a larger continuous inboard flange 57 formed along its outboard and inboard periphery, respectively, and extending generally vertically therefrom. It is this modification to mounting tube 56 as compared to prior art mounting tubes 14, namely, inboard and outboard flanges 57, 58, respectively, which form a part of and cooperate with the other components of spacer apparatus 50, including beam sidewall rings 53 and 54 and conventional spacer disks 28.

To assemble bushing assembly 13' with the other components of beam 12', smaller outboard mounting tube flange 58 is inserted through larger inboard beam opening 51 and is abutted against the interior surface of outboard sidewall ring 54. Larger inboard mounting tube flange 57 in turn abuts the exterior surface of inboard sidewall ring 53, and the abutting components are welded together or securely attached by other suitable means.

FIG. 4B represents pivotally mounted beam bushing assembly 13' in a static state when the trailer is not operational. In accordance with one of the main features of third embodiment spacer apparatus 50 of the present invention, FIG. 4C represents one possible scenario of how bushing assembly 13' reacts when subjected to vertical loads V and side loads S such as when the vehicle is cornering. As can be seen, relative movement toward the vehicle driver's side occurs between mounting tube 56, and spacer disk 28 and beam outboard sidewall ring 54. Thus, in the scenario shown in FIG. 4C, if side load forces are acting in the direction of arrows S and vertical forces in the direction of arrow V, the planar surface of beam outboard sidewall ring 54 contacts spacer disk 28. More specifically, the side load forces and rubbing forces are spread out over the entire surface of outboard sidewall ring 54, as transferred from similarly planar mounting tube outboard flange 58, thereby transferring such forces in a very dispersed manner via the large bearing surfaces of flange 58 and ring 54 to spacer disk 28, thus preventing or minimizing excessive wear or damage thereto. If sidewall forces were acting in the opposite direction, or toward the passenger side of the vehicle, it clearly can be seen that it is inboard mounting tube flange 57 which distributes the side load forces evenly to its respective spacer disk 28, as transferred from planar inboard sidewall ring 53.

Therefore, it can be seen that the components of third embodiment spacer apparatus 50, including inboard and outboard beam sidewall rings 53, 54, respectively, inboard and outboard mounting tube flanges 57, 58, respectively, and spacer disks 28, all cooperate to prevent any point or line contact between any surface of beam 12' or its bushing assembly 13', and the spacer disks. Thus, excessive wear or damage to spacer disks 28 due to line or point contact forces are minimized or altogether eliminated. Rather, such forces are more evenly distributed throughout the relatively large planar bearing surfaces of sidewall rings 53, 54 and mounting tube flanges 57, 58, thus providing effective insulation against direct metal-to-metal contact between any structures of beam 12' or its mounting tube 13' and hanger sidewalls 22.

It is understood that various other suitable materials could be utilized for the components of spacer apparatus 30, 40 and 50 other than those shown and described above, without affecting the overall concept of the present invention. It also is contemplated that other designs could be utilized to achieve the desired result of the present invention, namely, to protect spacer disks against undue wear due to non-planar point or line contact of metal beam surfaces against the spacer disk, or alternatively, against relative movement between the beam and spacer disks, resulting in such contact. Thus, it can be seen that spacer apparatus 30, 40 and 50 of the present invention all overcome the disadvantages associated with use of prior art spacer disks 28 alone.

It is further understood that the embodiments of the present invention described hereinabove are also contemplated for use with leading arm-type axle/suspension systems and spring beams. The present invention also can be utilized on other types of heavy-duty vehicles such as semi-trailer tractors, straight trucks such as dumps, and the like.

Accordingly, the improved spacer apparatus of the present invention is simplified, provides an effective, safe, inexpensive, and efficient apparatus which achieves all the enumerated objectives, provides for eliminating difficulties encountered with prior conventional spacer disks or wear pads, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved spacer apparatus is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A suspension assembly of a heavy-duty vehicle axle/suspension system, said assembly having a beam, said beam including a bushing assembly for pivotally mounting the beam on a vehicle frame via a frame hanger, wherein the improvement comprises:

a) an integral spacer apparatus, said spacer apparatus including a spacer disk and a collar, said spacer disk being vertically disposed between said bushing assembly and a respective one of a pair of spaced sidewalls of said frame hanger, the spacer disk being formed of a generally rigid polymer, said collar being disposed along at least a portion of the periphery of said spacer disk for engaging the bushing assembly to generally prevent movement of the spacer disk relative to said bushing assembly, whereby excessive wear to said spacer disk generally is prevented.

2. The improvement means of claim 1, in which said collar extends perpendicularly inwardly from said periphery of said disk toward its respective bushing assembly side; and in which a continuous groove is formed on the surface of the disk adjacent to the bushing assembly and said collar; and in which said groove and the collar provide a complementary fit of the spacer apparatus on a mounting tube of said bushing assembly.

3. The improvement means of claim 1, in which a pair of collars are formed on said spacer apparatus; in which a front collar extends along about the front one-half of the spacer disk periphery; in which a top and a bottom rear end of said front collar each provide a stop against a respective one of a top and a bottom wall of said beam to prevent excessive rotation of said disk; and in which a rear collar extends along about one-half of the rear one-half of the disk periphery and is narrower than the front collar.

4. The improvement means of claim 1, in which said spacer apparatus is formed in one piece of ultra-high molecular weight polyethylene.

5. A suspension assembly of an axle/suspension system, said assembly having a beam, said beam including a bushing assembly for pivotally mounting the beam on a vehicle frame via a frame hanger, wherein the improvement comprises:

a) an integral spacer apparatus, said spacer apparatus including a spacer disk, the spacer apparatus substantially preventing movement of said spacer disk relative to said bushing assembly, said spacer apparatus being vertically disposed between each side of the bushing assembly and a respective one of a pair of spaced sidewalls of said frame hanger, front and rear collars being formed on the spacer apparatus along at least a portion of the outer periphery of the disk and extending perpendicularly inwardly therefrom toward its respective bushing assembly side, said front collar extending about a front one-half of said spacer disk periphery, a top and a bottom rear end of the front collar each providing a stop against a respective one of a top and a bottom wall of said beam to prevent excessive rotation of the disk, said rear collar extending along about one-half of a rear one-half of said disk periphery and being narrower than the front collar, a surface of the disk being formed with a continuous groove adjacent to the bushing assembly and said collars, said groove and the collars providing a complementary fit of said spacer apparatus on a mounting tube of said bushing assembly, whereby excessive wear to said spacer disk generally is prevented.

6. A suspension assembly of an axle/suspension system, said assembly having a beam, said beam including a bushing assembly for pivotally mounting the beam on a vehicle frame via a frame hanger, wherein the improvement comprises:

a) an integral spacer apparatus, said spacer apparatus including a spacer disk, the spacer apparatus substantially preventing movement of said spacer disk relative to said bushing assembly, said spacer apparatus being vertically disposed between each side of the bushing assembly and a respective one of a pair of spaced sidewalls of said frame hanger, at least one collar being formed along at least a portion of the outer periphery of said disk and extending perpendicularly inwardly therefrom toward its respective bushing assembly side, a surface of the disk being formed with a continuous groove adjacent to the bushing assembly and said collars, said groove and the collars providing a complementary fit of said spacer apparatus on a mounting tube of said bushing assembly, whereby excessive wear to said spacer disk generally is prevented.

7. The suspension assembly of an axle/suspension system of claim 6, in which said spacer apparatus is formed in one piece of ultra-high molecular weight polyethylene.

* * * * *